(12) United States Patent
Yang et al.

(10) Patent No.: US 9,572,186 B2
(45) Date of Patent: Feb. 14, 2017

(54) INTRACELL DEVICE-TO-DEVICE COMMUNICATION CONTROL

(71) Applicant: Intel Corporation, Santa Clara, CA (US)

(72) Inventors: Rongzhen Yang, Shanghai (CN); Hui Ding, Shanghai (CN); Hujun Yin, Saratoga, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/588,090

(22) Filed: Dec. 31, 2014

(65) Prior Publication Data

US 2016/0192418 A1    Jun. 30, 2016

(51) Int. Cl.
*G01R 31/08*    (2006.01)
*H04J 1/16*    (2006.01)
*H04L 1/00*    (2006.01)
*H04W 76/02*    (2009.01)

(52) U.S. Cl.
CPC .................................. *H04W 76/023* (2013.01)

(58) Field of Classification Search
CPC ............................. H04W 92/18; H04W 16/14
See application file for complete search history.

(56) References Cited

U.S. PATENT DOCUMENTS

| 8,493,887 | B2* | 7/2013 | Palanki | H04W 8/005 370/254 |
| 8,660,550 | B2* | 2/2014 | Jung | H04W 76/023 375/265 |
| 2012/0184306 | A1* | 7/2012 | Zou | H04W 76/023 455/458 |
| 2013/0288608 | A1 | 10/2013 | Fwu et al. | |
| 2014/0004796 | A1 | 1/2014 | Cakulev et al. | |
| 2014/0078952 | A1 | 3/2014 | Bontu et al. | |
| 2014/0204847 | A1 | 7/2014 | Belleschi et al. | |
| 2014/0219095 | A1 | 8/2014 | Lim et al. | |
| 2014/0348079 | A1* | 11/2014 | Turtinen | H04W 72/0406 370/329 |

OTHER PUBLICATIONS

International Search Report and Written Opinion for PCT Patent Application No. PCT/US15/061983 mailed Feb. 23, 2016, 13 pgs.

* cited by examiner

*Primary Examiner* — Maharishi Khirodhar
(74) *Attorney, Agent, or Firm* — Schwabe, Williamson & Wyatt, P.C.

(57) ABSTRACT

A user equipment comprises one or more antennas, a processor to communicate with an enhanced Node B (eNB) of an Internet Protocol (IP) based wireless communication network via the antenna; and a storage medium coupled to the processor, the storage medium having instructions stored thereon, that if executed by the processor, result in: requesting the eNB for a direct communication with a second user equipment, wherein the user equipment and the second user equipment are in a cell of the eNB; performing a first channel measurement based on a command from the eNB; receiving direct communication related information from the eNB based on a result of the first channel measurement; and performing a configuration based on the direct communication related information to perform the direct communicate with the second user equipment.

12 Claims, 8 Drawing Sheets

INTRACELL DEVICE-TO-DEVICE COMMUNICATION CONTROL

BACKGROUND

Wireless mobile communication technology utilizes various standards and protocols for communication between wireless devices, e.g., a base transceiver station (BTS) and a wireless mobile device. In the third generation partnership project (3GPP) long term evolution (LTE) systems, the BTS is a combination of an evolved Node Bs (eNode Bs or eNBs) and Radio Network Controllers (RNCs) in a Universal Terrestrial Radio Access Network (UTRAN), which communicates with the wireless mobile device, known as a user equipment (UE).

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Figure 1:
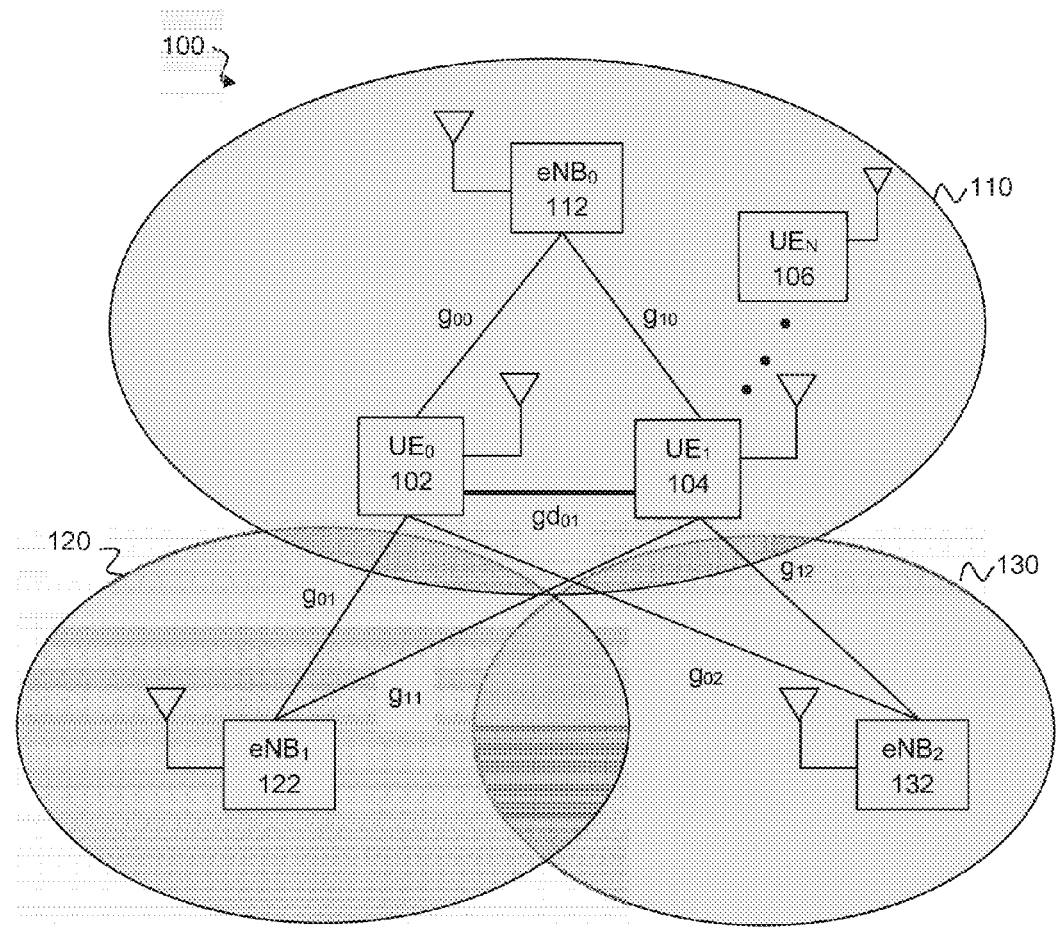
FIG. 1 schematically illustrates an example of a wireless network according to an embodiment.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices. Some transitory examples of a machine-readable medium may comprise electrical, optical, acoustical or other forms of propagated signals (e.g., carrier waves, infrared signals, digital signals, etc.), and others.

The following description may include terms, such as first, second, etc. that are used for descriptive purposes only and are not to be construed as limiting.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

While example embodiments may be described herein in relation to cellular networks in general, embodiments of the present disclosure are not limited thereto and can be applied to other types of wireless networks where similar advantages may be obtained. Such networks include, but are not limited to, broadband wireless access (BWA) networks, wireless local area networks (WLANs), wireless personal area networks (WPANs) and/or wireless wide area networks (WWANs) and the like.

The following embodiments may be used in a variety of applications including transmitters and receivers of a mobile wireless radio system. Radio systems specifically included within the scope of the embodiments include network interface cards (NICs), network adaptors, base stations, access points (APs), relay nodes, evolved node Bs, gateways, bridges, hubs and satellite radiotelephones. Further, the radio systems within the scope of embodiments may include satellite systems, personal communication systems (PCS), two-way radio systems, global positioning systems (GPS), two-way pagers, personal computers (PCs) and related peripherals, personal digital assistants (PDAs), personal computing accessories and existing and future arising systems which may be related in nature and to which the principles of the embodiments could be suitably applied.

FIG. 1 schematically illustrates a wireless communication network 100. In various embodiments, the wireless communication network 100 may comprise a cellular network or any other wireless communication network. The wireless communication network 100 may be distributed over one or more cells such as cells 110, 120 and 130. A cell may be served by at least one base station. A base station may wirelessly communicate with one or more wireless mobile devices, known as a user equipment (UE). A base station may provide radio resources across multiple carriers to one more UEs. According to various embodiments, the base stations 112, 122 and 132 may be evolved Node-B (eNB) stations. For example, a base station may be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless mobile device. An eNB station may include multiple antennas, one or more radio modules to modulate and/or demodulate signals transmitted or received on an air interface, and one or more digital modules to process signals transmitted and received on the air interface.

In various embodiments, a UE may be a subscriber station that is configured to concurrently utilize radio resources across multiple carriers such as in a carrier aggregation scheme using protocols compatible with the 3GPP standards including, for example, Long Term Evolution (LTE) including LTE Advanced or variants thereof. Carrier aggregation may increase channel bandwidth by combining the capacity of several individual carriers. The aggregated carriers can be adjacent or nonadjacent and can be in a single band or in different bands. Each individual carrier may be referred to as a component carrier (CC).

In various embodiments, a UE such as 102, 104 or 106 may support multiple-input and multiple-output (MIMO) communication with at least one of the base stations 112, 122 and 132. For example, a UE may comprise one or more antennas to concurrently utilize radio resources of multiple respective component carriers (e.g., carriers of base stations 112, 122 and 132) of the wireless communication network 100. The UEs may communicate using Orthogonal Frequency Division Multiple Access (OFDMA) (e.g., downlink) and/or Single-Carrier Frequency Division Multiple Access (SC-FDMA) (e.g., uplink) in some embodiments. In various embodiments, a UE may be a cellular phone, a mobile phone, a personal computer (PC), a notebook, an ultra mobile PC (UMPC), a handheld mobile device, an universal integrated circuit card (UICC), a personal digital assistant (PDA), a Customer Premise Equipment (CPE), or other consumer electronics such as MP3 players, digital cameras and the like, personal computing accessories and existing and future arising wireless mobile devices which may be related in nature and to which the principles of the embodiments could be suitably applied.

As shown in FIG. 1, the network 100 may comprise eNB 112 and may further include one or more eNBs, such as eNB 122 or 132. At least initially, the eNB 112 may have an established wireless connection with a UE. The eNBs may each have generally the same transmission power capabilities as one another or, alternatively, some of the eNBs may have relatively lower transmission power capabilities. In various embodiments, the eNB 112 may communicate with a UE within a first area, e.g., a cell 110, while the eNB 122 may communicate within a second area or cell 120. One or more UEs such as 102, 104 or 106 may locate in a cell 110. In one embodiment, the one or more UEs may communication with each other in a device-to-device (D2D) communication mode or an eNB relay mode.

In various embodiments, a device-to-device (D2D) communication among UEs may comprise different architectures. For example, in a centralized mode, an eNB may have a control of the D2D communication among a plurality of UEs in a home cell of the eNB. For example, eNB 112 may take full control of radio resources for the communication among the UEs in a cell 110 of eNB 112, e.g., between 102 and 104. In some embodiments, one or more neighbor eNBs 122 and 132 may further be utilized to control the resources for communication between a UE in the cell 110 of eNB 112 and a UE in a cell of neighbor eNB 122 or 132. In some embodiments, the centralized D2D mode may be utilized with a higher priority for interference control.

In some embodiments, a first UE, e.g., UE 102 may communicate with a second UE, e.g. UE 104 in the same cell as the first UE directly without involvement of an eNB, such as in a distributed mode. For example, UE 102 may have a D2D communication with UE 104 directly without the control of any eNB. In yet some embodiments, the D2D communication among UEs may be in a hybrid mode that may be a mix of the centralized mode and the distributed mode. For example, the D2D communication among UEs may be controlled by one or more eNBs. For example, at least one eNB, e.g., eNB 112, may control at least a portion of the radio resources for the D2D communication between the first UE 102 and the second UE 104.

As shown in FIG. 1, $g_{xy}$ may be used to represent a channel gain between a $UE_x$ and an $eNB_y$, and $gd_{xy}$ may be used to represent a channel gain between a first $UE_x$ and a second $UE_y$ in a D2D mode. For example, $g_{00}$ may represent a channel gain between the first $UE_0$ 102 and $eNB_0$ 112 whereas $gd_{01}$ may represent a channel gain between the first $UE_0$ 102 and a second $UE_1$ 104 that are or are to be in D2D communication. A channel gain between the second $UE_1$ 104 and $eNB_0$ 112 may be represented by $g_{10}$. Similarly, FIG. 1 illustrates a channel gain $g_{01}$ between the first $UE_0$ 102 and $eNB_1$ 122, a channel gain $g\,02$ between the first UE 102 and $eNB_2$ 132, a channel gain $g_{11}$ between the second $UE_1$ 104 and $eNB_1$ 122 and a channel gain $g_{12}$ between the second $UE_1$ 104 and $eNB_2$ 132.

Figure 2A:
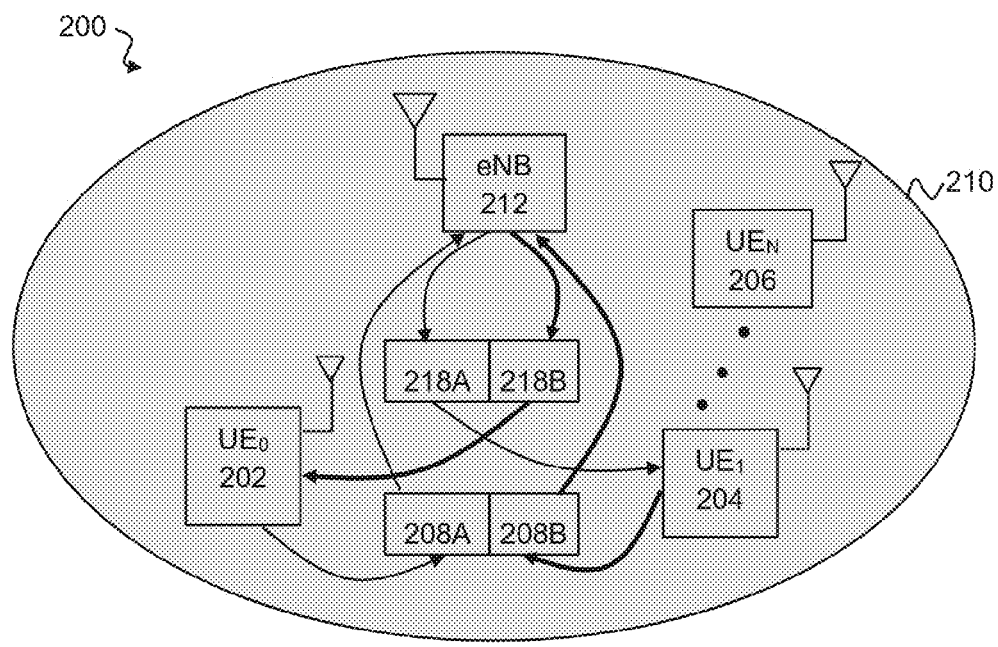
FIG. 2A schematically illustrates an example of an eNB relay mode according to an embodiment.
Figure 2B:
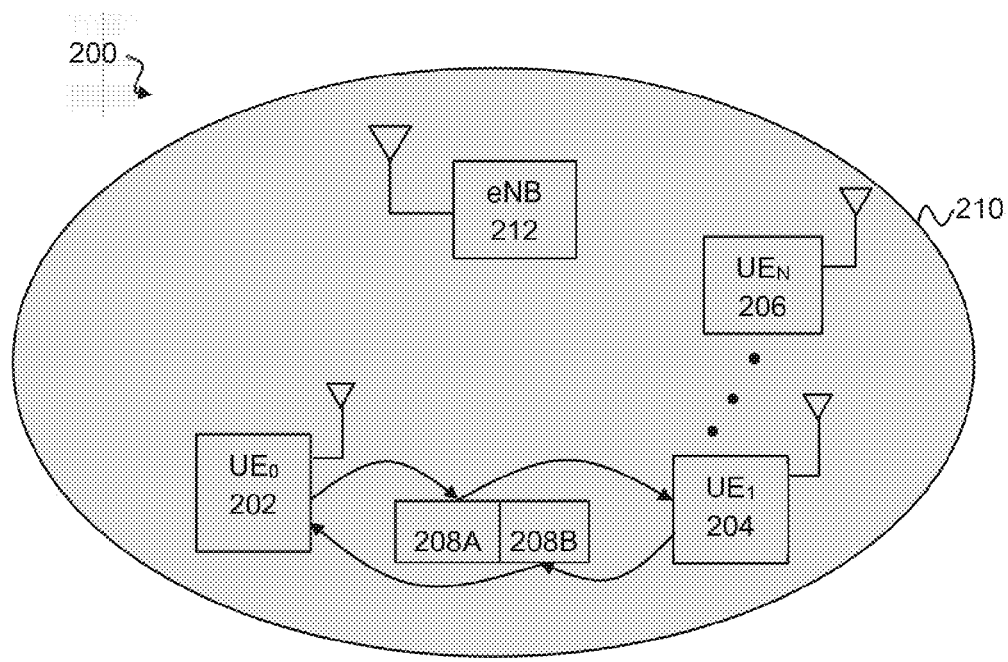
FIG. 2B schematically illustrates an example of a device to device (D2D) mode according to an embodiment.

In various embodiments, a D2D communication may be enabled in a cell with co-existing of other network elements that may share the same one or more frequency resources, e.g., spectrum and/or time, with the D2D communication. For example, the first $UE_0$ 102 and the second $UE_1$ 104 in a D2D communicate mode may share one or more frequency resources with a third UE that may be in an eNB relay mode, e.g., as shown in FIG. 2A or a D2D communication mode, e.g., as shown in FIG. 2B. Further, although FIG. 1 illustrates a D2D communication mode between the first $UE_0$ 102 and the second $UE_1$ 104, in various embodiments, other mobile devices in the same cell may communicate in a D2D mode or an eNB mode.

FIGS. 2A and 2B schematically illustrate two communication modes that may be selected by an eNB for UE communication in a cell of the eNB. As shown in FIG. 2B, an example of a D2D communication mode is illustrated. In various embodiments, UEs 202 and 204 may locate in a cell 210 of eNB 212 and may communicate in a D2D communication mode. For example, UEs 202 and 204 may communicate with each other directly in the D2D communication mode. As shown in FIG. 2B, the D2D communication between UEs 202 and 204 may be performed via uplink resources 208A and 208B. In some embodiments, the first UE 202 may utilize an uplink resource 208A to transmit a first signal or message or any other information to the second UE 204. The second UE 204 may send a second signal or message or any other information to the first UE 202 via an uplink resource 208B.

While FIG. 2B illustrates that UE 202 and UE 204 may utilize different uplink resources for a transmission from UE 202 to UE 204 and a transmission from UE 204 to UE 202, in some embodiments, UE 202 and UE 204 may communicate with each other via the same uplink resource, e.g., in a simultaneous transmission and reception (STR) mode. As shown in FIG. 2B, UEs 202 and 204 may utilize one or more uplink resources for their D2D communication, in some embodiments, UEs 202 and UE 204 may utilize one or more downlink (not shown) resources for the D2D communication. Further, while the example of FIG. 2B shows that UEs 202 and 204 may utilize one or more uplink resources in the cell 210 of eNB 212 for the D2D communication, in some embodiments, UEs 202 and 204 may share the resources with any other mobile device(s) in the cell 210 that may be in a D2D mode or an eNB relay mode of FIG. 2A. While FIG. 2B illustrates two uplink resources, in some embodiments, a different number of one or more uplink and/or downlink resources may be utilized for a D2D communication between the two UEs 202 and 204.

As shown in FIG. 2A, an embodiment of an eNB relay communication mode is illustrated. In one embodiment, eNB 212 may relay a communication between two UEs via one or more uplink resources and/or one or more downlink resources. For example, as shown in FIG. 2A, a first UE 202 may transmit to the eNB 212 a first message that is intended for a second UE 204 via an uplink resource 208A. The eNB 212 may utilize a downlink resource 218A to transfer the first message from the first UE 202 to the second UE 204. Similarly, a transmission from the second UE 204 to the first UE 202 may be relayed by eNB 212 via an uplink resource 208B and a downlink resource 218B. While FIG. 2A illustrates two uplink resources and two downlink resources, in some embodiments, a different number of one or more uplink and/or downlink resources may be utilized in an eNB relay communication mode. In some embodiments, the same uplink resource(s) and/or the same downlink resources may be utilized in the eNB relay mode.

In various embodiments, Shannon capacity formula may be applied to define a spectrum efficiency (SE) of a D2D communication mode and that of an eNB relay mode of FIGS. 2A and 2B, respectively. The following equation (1) may represent a spectrum efficiency of a communication (or transmission) in a direction, e.g., from a second $UE_y$ to a first $UE_x$ in a D2D transmission mode:

$$SE\_D2D(UE_x) = \log(1 + D2D\_SINR_{UE_x}) = \qquad \text{Eq. (1)}$$
$$\log\left(1 + \frac{P_{tx}(UE_y) \cdot gd_{x,y}}{\sum_{z=1}^{K} P_{tx}(UE_{s(z)}) \cdot gd_{x,s(z)} + I_x + N}\right),$$

wherein $SE\_D2D(UE_x)$ may represent a spectrum efficiency of the first $UE_x$ in the D2D mode, $D2D\_SINR_{UEx}$ may represent a signal to interference plus noise ratio (SINR) for $UE_x$ in the D2D mode, $P_{tx}(UE_y)$ may represent an assigned transmit power for a transmission from the second $UE_y$ to the first $UE_x$ in the D2D mode. $P_{tx}(UE_{s(z)})$ may represent an assigned transmit power of a D2D transmission from $UE_{s(z)}$ to the first $UE_x$, wherein $UE_{s(z)}$ may represent one or more other UEs that are in the same cell as the D2D pair $UE_x$ and $UE_y$, and share the same resource(s) with the D2D pair $UE_x$ and $UE_y$.

Here, z may have a value from 1 to K, wherein K may represent a number of the one or more other UEs in the cell where the first $UE_x$ and the second $UE_y$ locate and share the same resource(s) with $UE_x$ and $UE_y$. As shown in Equation (1), $gd_{x,y}$ may represent a channel gain between the first $UE_x$ and the second $UE_y$, and $gd_{x,s(z)}$ may represent a channel gain between the first $UE_x$ and $UE_{s(z)}$. In some embodiments, the one or more other $UE_{s(z)}$ may be absent in the cell where the first $UE_x$ and the second $UE_y$ locate and the assigned transmit power $P_{tx}(UE_{s(z)})$ and $gd_{x,s(z)}$ may be omitted. Further, N may denote a noise power of additive white Gaussian noise (AWGN) received at the first $UE_x$. $I_x$ may denote an interference at $UE_x$, e.g., from $UE_y$ and/or the one or more other $UE_{s(z)}$ that may share the same uplink and/or downlink resource(s) with $UE_x$.

The following equations (2) and (3) may represent, respectively, an uplink spectrum efficiency and a downlink spectrum efficiency of a first $UE_x$ in a cell of $eNB_q$, wherein the first $UE_x$ may communicate with a second UE, e.g., $UE_y$ in the cell of $eNB_q$ in an eNB relay mode:

$$SE\_eNB_{DL}(UE_x) = \qquad \text{Eq. (2)}$$
$$\log(1 + DL\_SINR_{UE_x}) = \log\left(1 + \frac{P_{tx}(eNB_q) \cdot g_{x,q}}{I_{DL,x} + N}\right),$$

$$SE\_eNB_{UL}(UE_x) = \qquad \text{Eq. (3)}$$
$$\log(1 + UL\_SINR_{UE_x}) = \log\left(1 + \frac{P_{tx}(UE_x) \cdot g_{x,q}}{I_{eNB} + N}\right),$$

wherein $SE\_eNB_{DL}(UE_x)$ may represent a downlink spectrum efficiency of the first $UE_x$ and $SE\_eNB_{UL}(UE_x)$ may represent an uplink spectrum efficiency of the first $UE_x$. $P_{tx}(eNB_q)$ may represent an assigned transmit power of a transmission from the $eNB_q$ to the first $UE_x$, $P_{tx}(UE_x)$ may represent an assigned transmit power of a transmission from the first $UE_x$ to the $eNB_q$, and $g_{x,q}$ may represent a channel gain between $UE_x$ and $eNB_q$. $I_{DL,x}$ may represent a downlink interference received by the first $UE_x$, e.g., from the second $UE_y$ and/or one or more other UEs that may share the same uplink/downlink resource(s) with the first $UE_x$ and $I_{eNB}$ may represent an uplink interference received by $eNB_q$. N in equation (2) may represent a noise power of additive white Gaussian noise (AWGN) received at a receiver, e.g., of the first $UE_x$. And, N in equation (3) may represent a noise power of additive white Gaussian noise (AWGN) received at the $eNB_q$.

In various embodiments, a cost function may be utilized to represent a size of one or more resources that may be used for a normalized communication throughput requirement in a communication mode. In various embodiments, the cost function may be used to evaluate an efficiency of a communication mode. In various embodiments, an eNB may select a communication mode for, e.g., two UEs in a cell of the eNB based on the cost function. A cost function for a D2D mode may be represented by Equation (4):

$$C\_D2D(UE_x, UE_y) = \frac{1}{SE\_D2D(UE_x)} + \frac{1}{SE\_D2D(UE_y)}, \quad \text{Eq. (4)}$$

wherein C_D2D ($UE_x$, $UE_y$) may represent a cost function of a D2D communication mode for $UE_x$ and $UE_y$. SE_D2D ($UE_x$) may represent a spectrum efficiency for $UE_x$ in the D2D mode and SE_D2D($UE_y$) may represent a spectrum efficiency for $UE_y$ in the D2D mode.

In various embodiments, a cost function of an eNB relay mode for $UE_x$ and $UE_y$ may be represented by the following equation (5):

$$C\_eNB(UE_x, UE_y) = \frac{1}{SE\_eNB_{UL}(UE_x)} + \frac{1}{SE\_eNB_{UL}(UE_y)} + \quad \text{Eq. (5)}$$
$$\alpha \times \left( \frac{1}{SE\_eNB_{DL}(UE_x)} + \frac{1}{SE\_eNB_{DL}(UE_y)} \right),$$

wherein C_eNB($UE_x$, $UE_y$) may represent a cost function of an eNB relay communication for $UE_x$ and $UE_y$. SE_eNB$_{UL}$ ($UE_x$) may represent an uplink spectrum efficiency of $UE_x$ in the eNB relay mode and SE_eNB$_{UL}$($UE_y$) may represent an uplink spectrum efficiency of $UE_y$ in the eNB relay mode. And, SE_eNB$_{DL}$($UE_x$) may represent a downlink spectrum efficiency of $UE_x$ in the eNB relay mode and SE_eNB$_{DL}$ ($UE_y$) may represent a downlink spectrum efficiency of $UE_y$ in the eNB relay mode. Herein, $\alpha \geq 0$ and $\alpha$ may denote a downlink resource weighting factor that may be controlled by eNB to evaluate the cost comparison. For example, if $\alpha=0$, it may represent a usage of downlink resource is costless.

In various embodiments, an eNB may utilize the following Equation (6) to determine which communication mode, e.g., a D2D mode or an eNB relay mode to select:

$$C\_D2D(UE_x,UE_y) < C\_eNB(UE_x,UE_y) \quad \text{Eq. (6)},$$

wherein C_D2D($UE_x$,$UE_y$) may represent a cost function for a D2D communication between $UE_x$ and $UE_y$ and C_eNB ($UE_x$,$UE_y$) represent a cost function for a communication between $UE_x$ and $UE_y$ in an eNB relay mode. In various embodiments, an eNB may decide to select the D2D mode if the condition in Equation (6) is satisfied. Otherwise, an eNB may select an eNB relay mode in response to determining that the cost of the D2D mode is larger than the cost of the eNB relay mode.

In various embodiments, an eNB may utilize one or more parameters, e.g., those defined in Equation (6), to decide whether to select a D2D communication mode or an eNB relay mode for, e.g., two or a pair of UEs that are to communicate with each other. In various embodiments, the parameters may comprise one or more selected from a group used in the equations. For example, the group may comprise a channel gain between the two UEs in a D2D mode, a channel gain between each of the two UEs and the eNB, a transmission power of the eNB, a transmission power of each of the two UEs in the D2D mode, a transmission power of each of the two UEs in the eNB relay mode, a transmission power of the eNB, an interference level received by each of the two UEs in the D2D mode, a downlink interference level received by each of the two UEs in the eNB relay mode, an uplink interference level received by the eNB, a noise power received by each of the two UEs, a noise power received by the eNB, a sum of transmission powers of one or more other UEs in the cell of the eNB that may share one or more resources with the two UEs, and/or a channel gain between each of the two UEs and the one or more other UEs and/or any other parameter that may be used to determine a cost function of a communication mode. In various embodiments, the eNB may determine a communication mode based on one or more of the parameters in the equations.

Figure 3:
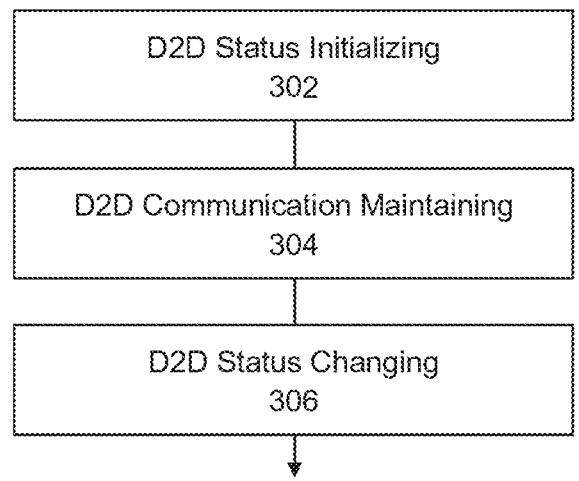
FIG. 3 schematically illustrates an example of a method according to an embodiment.

FIG. 3 schematically illustrates an example method 300 for a centralized communication control mode in accordance with some embodiments. The method 300 may be used by an eNB, e.g., 212 as shown in FIG. 2B, to control a D2D mode for UEs, e.g., UE 202, UE 204 or UE 206 as shown in FIG. 2B. At 302, the eNB 212 may trigger or initiate D2D status initialization. In some embodiments, the eNB 212 may trigger or initiate the D2D status initialization periodically. In some embodiments, the eNB 212 may trigger the D2D status initialization for two UEs and may regard the two UEs as a pair of D2D candidates, e.g., in response to determining that there is enough traffic between the two UEs, e.g., based on network handover information associated with the two UEs. In some embodiments, the eNB 212 may trigger the D2D status initialization for two UEs and may regard the two UEs as D2D candidates in response to determining that the two UEs are close enough, e.g., based on location based service (LBS) information, e.g., Media Access Control (MAC) address, associated with the two UEs. In some other embodiments, the eNB 212 may trigger the D2D status initialization for two UEs in response to determining that a signal strength of either or both of the two D2D candidate UEs is high.

In some embodiments, the eNB 212 may initiate D2D status initialization for two UEs and may regard the two UEs as D2D candidates, e.g., in response to receiving one or more requests from at least one of the two UEs that are to communicate in a D2D mode. For example, a first UE, e.g., 202, may transmit a request for D2D mode to the eNB 212, e.g., in response to determining that there is enough traffic with a second UE, e.g., 204, in the same cell as the first UE. In some other embodiments, UE 202 may send a request for D2D mode to the eNB 212 in response to or during an establishment of a communication link with a wireless network (e.g., 100 of FIG. 1). In some embodiments, UE 202 may transmit to the eNB 212 a request for a D2D communication with UE 204, e.g., in response to arriving at or entering a cell of the eNB 212. In some embodiments, UE 202 and/or UE 204 may send the request for D2D mode to the eNB 212 via a message. In some embodiments, UE 202 and/or UE 204 may transmit any other information to the eNB 212 to request for the D2D mode.

In various embodiments, the eNB 212 may perform a communication mode selection in response to the triggering of the D2D status initialization. For example, the eNB 212 may instruct each of the paired D2D candidates to perform a channel measurement, e.g., via a sounding reference signal (SRS). The eNB 212 may determine whether to select a D2D mode for the pair of D2D candidate UEs, e.g., 202 and 204 based on the channel measurement results. The channel measurement results may comprise SRS information obtained by each of the D2D candidates 202 and 204 from each other and/or from one or more UEs that may share one or more resources of the eNB 212 with the D2D candidate(s). For example, eNB 212 may obtain one or more parameters, e.g., in Equation (6), based on the channel measurement results. The eNB 212 may obtain a cost function of the D2D mode and that of the eNB relay mode based on the channel measurement results. The eNB 212 may determine whether to select the D2D mode or an eNB relay mode based on a comparison between the cost function of the D2D mode and that of the eNB relay mode, e.g., based on equation (6). In some embodiments, in response to determining that the D2D mode has a smaller cost, the eNB 212 may select the D2D mode for the D2D candidate UEs. In response to selecting the D2D mode for the D2D candidate UEs, the eNB 212 may transmit D2D information associated with the selected D2D mode to the D2D candidates. In some embodiment, the D2D candidate UEs, for which the D2D mode has been selected by the eNB 212, may be called as D2D UEs. The D2D UEs that are to communicate in the selected D2D mode may utilize the D2D information for UE configuration. A D2D communication may be set up in response to the completion of the UE configuration.

As shown in FIG. 3, the flow goes to block 304 that may relates to D2D communication maintaining, in response that the D2D session is successfully established at block 302. In some embodiments, at 304, in response to the establishment of the D2D session at 302, the eNB 212 may assign one or more resource(s) to the D2D UEs, e.g., 202 and 204, for their D2D communication in the D2D communication mode. In some embodiments, the eNB 212 may further assign the one or more resources to one or more other UEs, e.g., 206 that are to share the one or more resources with the D2D UEs 202 and 204. And, the eNB 212 may maintain the D2D communication for the pair of D2D UEs at 304.

In some embodiments, during the D2D communication maintaining at 304, each of the D2D UEs 202 and 204 in the D2D UE pair may perform a channel measurement on the second D2D UE in the D2D UE pair and one or more other UEs 206 via SRS, e.g., periodically or at a predetermined time during the D2D maintaining at 304. The D2D UEs 202 and 204 may each report the channel measurement result, e.g., SRS information, obtained in the channel measurement to eNB 212 periodically or at a predetermined time. In some embodiments, the eNB 212 may perform a channel measurement to obtain SRS information on each UE in the D2D pair 202 and 204 and on one or more other UEs 206 periodically. In some embodiments, the eNB 212 and/or the D2D UE pair 202 and 204 may each perform a channel measurement periodically; however, in some other embodiments, this may not be required.

In some embodiments, at 304, the eNB 212 may command the D2D UEs 202 and/or 204 to perform a power adjustment and/or a link adaption based on the SRS, e.g., measured by the D2D UEs 202 and/or 204 and/or the eNB 212, obtained in the channel measurement during the D2D communication maintaining. For example, eNB 212 may instruct the D2D UEs 202 and/or 204 to increase the power and/or perform link adaption in response to determining from the SRS that a channel gain between the paired D2D UEs is lower than a channel gain threshold, and/or an interference level at the UEs 202 and/or 204 is higher than an interference threshold, and/or a noise received at the UEs 202 and/or 204 is higher than a noise threshold.

In some other embodiments, a first UE in the D2D pair may instruct a second UE in the D2D pair to perform the power increasing and/or the link adaption in response to determining from the SRS that a channel gain between the two D2D UEs is lower than a channel gain threshold, and/or an interference level at the second UE is higher than an interference threshold, and/or a noise received at the second UE is higher than a noise threshold. For example, the link adaption may comprise a quadrature amplitude modulation (QAM) and/or a modulation and coding scheme (MCS) level adjustment. In various embodiments, a D2D UE may perform the power adjustment and/or the link adaption to reduce an interference in the D2D communication.

At 304, the eNB 212 may further check an efficiency of the selected D2D mode based on the channel measurement results, e.g., SRS information reported by the D2D UE pair 202 and 204 and/or SRS information measured by the eNB 212. In some embodiments, the eNB 212 may perform the selected D2D mode efficiency check based on, e.g., Equation (6) and/or one or more parameters used in Equation (6) periodically during the D2D communication maintaining at 304. The eNB 212 may maintain the D2D mode in response to determining that Equation (6) is satisfied.

Contrarily, the eNB 212 may trigger a D2D status change at block 306. In some other embodiments, the eNB 212 may trigger the D2D status change at 306 in response that the D2D communication of the pair of the D2D UEs 202 and 204 ends. In some embodiments, the eNB 212 may trigger the D2D status change at 306 in response to determining that the traffic of the communication between the pair of D2D UEs 202 and 204 is less than a threshold. For another example, the eNB 212 may trigger the D2D status change at 306 in response to determining that a distance between the D2D UE pair 202 and 204 is bigger than a threshold, e.g., based on LBS information. For another example, the eNB 212 may trigger the D2D status change at 306 in response to determining that a D2D UE may leave the cell of eNB 212. In another example, the eNB 212 may trigger the D2D status change at 306 in response to a request for the D2D status change from at least one D2D UE of the D2D pair.

In some embodiments, eNB 212 may perform a mode selection in response to triggering the D2D status change at 306. For example, the eNB 212 may compare a cost function of the D2D mode with that of a second communication mode, e.g., an eNB relay mode based on SRS measured by the pair of D2D UEs 202 and 204. The eNB 212 may change the D2D mode to the eNB relay mode in response to determining that an efficiency of the D2D mode may not satisfy Equation (6) based on the SRS information reported by the D2D UE pair and/or the SRS measured by the eNB 212. In some embodiments, the eNB 212 may transmit information on the selected eNB relay mode to the UEs 202 and 204 that are to communicate in the selected eNB relay mode. The UEs 202 and 204 may each perform UE configuration based on the eNB relay mode related information from the eNB 212. In some embodiments, the eNB 212 may further determine one or more other UEs that are to share one or more resources of the eNB 212 with the UEs 202 and/or 204 in the selected eNB relay mode. The eNB 212 may assign one or more resources for a communication between UEs 202 and 204 in the selected eNB mode.

Figure 4:
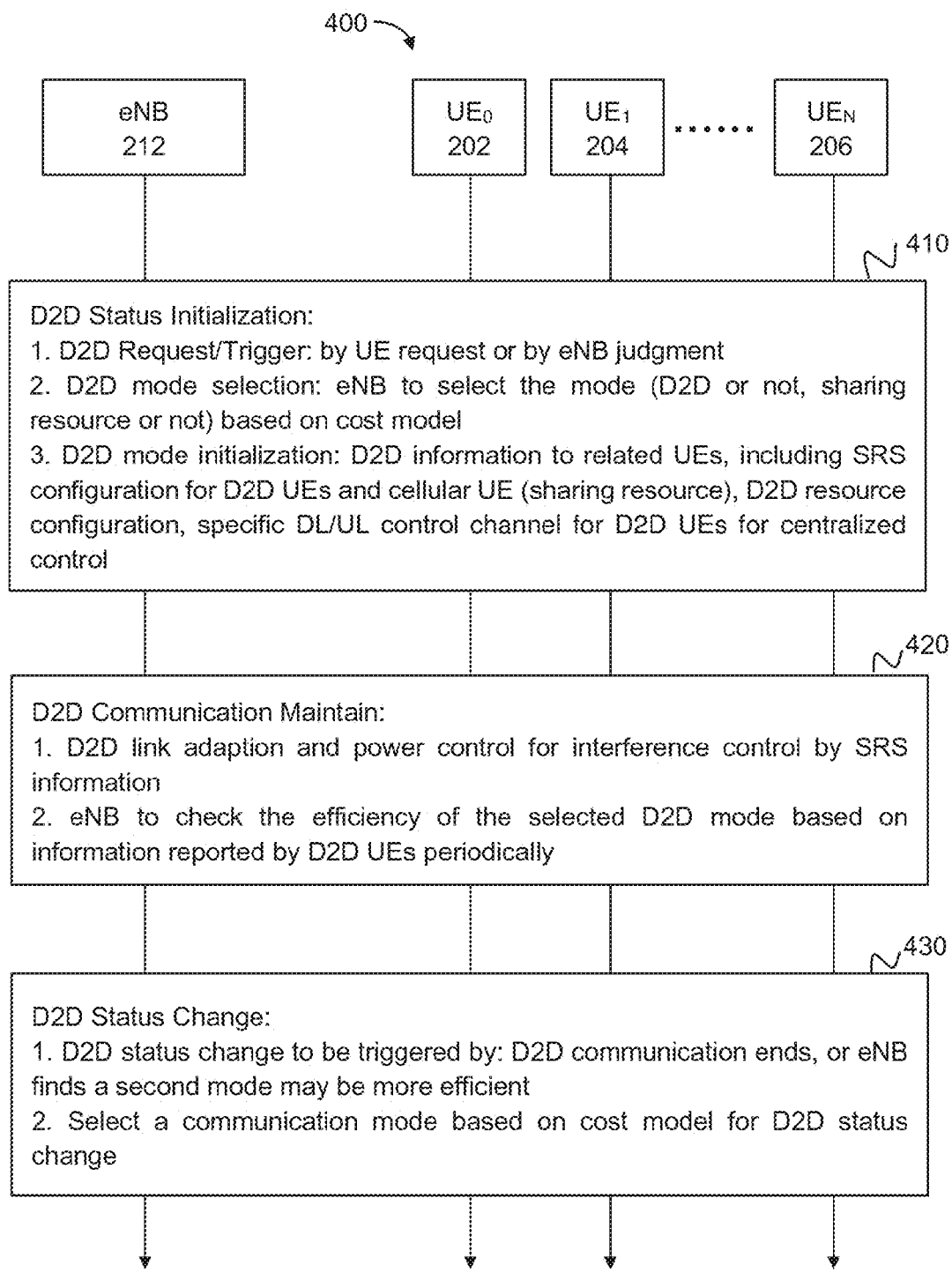
FIG. 4 schematically illustrates an example of a method according to an embodiment.

FIG. 4 schematically illustrates an example method 400 for a communication mode control in accordance with some embodiments. The method 400 may be used by an eNB (e.g., eNB 212) to select a D2D mode or an eNB relay mode for one or more UEs (e.g., UE 202, UE 204 or UE 206). At 410, the eNB 212 may trigger D2D status initialization for two D2D candidate UEs, e.g., 202 and 204, in a cell of the eNB 212, e.g., as discussed with regard to block 302. In some embodiments, the eNB 212 may trigger the D2D status initialization in response to determining that there is enough traffic between the two D2D candidate UEs 202 and 204, e.g., based on network handover information associated with the two UEs. In some embodiments, the eNB 212 may trigger the D2D status initialization in response to determining that the two D2D candidate UEs 202 and 204 are close enough based on, e.g., location based service (LBS) information associated with the two UEs.

In some other embodiments, the eNB 212 may trigger the D2D status initialization in response to receiving a request from at least one of the two D2D candidate UEs 202 and 204. For example, a D2D candidate UE may transmit to the eNB 212 a request for a D2D communication in response to, e.g., determining that there is enough traffic with another D2D candidate UE. In some embodiments, a D2D candidate UE may send the request to the eNB 212 during establishment of a communication link with a wireless network. In some embodiments, a D2D candidate UE may transmit to the eNB 212 the request for a D2D communication in response to arriving at or entering a cell of the eNB 212. In some embodiments, a D2D candidate UE may send the request for the D2D mode to the eNB 212 via a message. In some embodiments, a D2D candidate UE may transmit any other information to the eNB 212 to request for the D2D mode.

At 410, the eNB 212 may select a communication mode based on a channel measurement result obtained by at least one of the paired D2D candidates 202 and 204 in response to triggering the D2D status initialization. The eNB 212 may command each of D2D candidates 202 and 204 to perform a channel measurement, e.g., via SRS. In some embodiments, the eNB 212 may send a signal, a message, a command, control information, or any other information to command the D2D candidates 202 and 204 to perform the channel measurements. For example, the eNB 212 may transmit, e.g, a channel measurement command to the D2D candidate UEs 202 and 204. The paired D2D candidates 202 and 204 may each report a measurement result to eNB 212 via SRS, in response to receiving the command from the eNB 212. For example, a D2D candidate in the D2D candidate pair may obtain SRS information from the other D2D candidate in the pair and/or from one or more other UEs that in the cell of the eNB 212 and may share one or more resources of the eNB 212 with the D2D candidate pair.

In response to receiving the measurement results, e.g., SRS information measured by the D2D candidates 202 and 204, eNB 212 may decide which communication mode (e.g., a D2D communication mode or an eNB relay communication mode) to select for the D2D candidates 202 and 204 based on the measurement results. For example, eNB 212 may use the measurement results to obtain a cost model of the D2D mode and that of the eNB relay mode, e.g. as shown in Equation (4) and (5), respectively. The eNB 212 may compare the cost model of the D2D mode with that of the eNB relay mode to determine whether to select the D2D mode or the eNB relay mode. In response to determining that the cost of the D2D mode is less than that of the eNB relay mode, e.g., as shown in equation (6), the eNB 212 may select the D2D mode for the D2D candidates 202 and 204. The D2D candidate UEs 202 and 204, for which the D2D mode is selected by the eNB 212, may be called as D2D UEs. In some embodiments, the eNB 212 may further identify one or more other UEs that are to share one or more resources of the eNB 212 with the D2D pair 202 and 204 based on the measurement results obtained by the D2D pair.

Contrarily, eNB 212 may not select the D2D mode in response to determining that the cost function equation (6) is not satisfied, and the flow of FIG. 4 may terminate. In some other embodiments, in response to determining that the cost of the eNB relay mode is less than that of the D2D mode, the eNB 212 may select the eNB relay mode.

At 410, the eNB 212 may perform D2D mode initialization for the D2D UEs 202 and 204, in response to selecting the D2D mode for the D2D UEs 202 and 204. In some embodiments, eNB 212 may transmit D2D information associated with the selected D2D mode to the D2D UEs 202 and 204. For example, the D2D related information may comprise SRS configuration information for D2D UEs 202 and 204. The D2D information may further comprise SRS configuration information for the one or more other UEs, e.g., 206, that are to share one or more resources of the eNB 212 with the D2D UEs 202 and 204. In one embodiment, the D2D UEs 202 and 204 and/or the one or more other UEs 206 may use the SRS configuration information for possible resource sharing. In some embodiments, at least one of the D2D UEs 202 and 204 and/or the one or more other UEs 206 may use the SRS configuration information for a spatial reuse of the same time and/or frequency resource(s) of the eNB 212, e.g., for parallel transmission. In one example, the D2D UE pair 202 and 204 may share one or more resources of the eNB 212 with another D2D UE pair. In another example, the D2D UE pair 202 and 204 may share one or more resources of the eNB 212 with one or more other UEs that communicate in an eNB mode.

In some embodiments, the D2D related information may further comprise D2D related resource configuration information for the D2D UEs 202 and 204. In some other embodiments, the D2D related information may further comprise information on one or more downlink/uplink control channel resources for the D2D UEs 202 and 204. For example, the eNB 212 may utilize the downlink/uplink control channel resource information and/or other D2D related information to perform a centralized control on the D2D communication of the D2D UEs 202 and 204.

The D2D UEs 202 and 204 may utilize the D2D related information for UE configuration. In response to the configuration of the D2D UEs, a D2D communication for the D2D UEs may be set up. In some embodiments, the eNB 212 may assign one or more resources to the D2D UEs 202 and 204 and/or the one or more UEs 206.

At 420, the eNB 212 may perform D2D communication maintaining, e.g., in response to assigning the one or more resources to the D2D UEs 202 and 204 and/or the one or more UEs 206 at 410. In some embodiments, the D2D UEs 202 and/or 204 may perform link adaption and/or power control to control an interference for the D2D communication during the D2D communication maintaining. For example, a D2D UE of the D2D pair 202 and 204 may perform a channel measurement on the other UE in the D2D pair and/or one or more other resource sharing UEs 206, e.g., periodically, during the D2D communication maintaining to obtain SRS information. In some other embodiments, the eNB 212 may perform a channel measurement on the D2D UEs 202 and 204 and/or the one or more resource sharing UEs 206 via SRS. The D2D UE of the D2D pair may adjust the power of the UE and/or perform a link adaption based on the obtained measurement results, e.g., SRS information, in response to receiving a command signal from the other UE in the D2D pair and/or the eNB 212, e.g., as mentioned previously with regard to 304.

At 420, the eNB 212 may further check an efficiency of the selected D2D mode based on the channel measurement results, e.g., SRS information reported by the D2D UE pair 202 and 204 and/or SRS information measured by the eNB 212. In some embodiments, the eNB 212 may perform the selected D2D mode efficiency check based on, e.g., Equation (6) and/or one or more parameters used in Equation (6) periodically during the D2D communication maintaining. The eNB 212 may maintain the D2D mode in response to determining that Equation (6) is satisfied.

Contrarily, the eNB 212 may trigger a D2D status change at 430 in response to determining that Equation (6) is not satisfied or in response to finding that a second communication mode may be more efficient than the D2D mode at 420. For example, the eNB 212 may trigger the D2D status change at 430, e.g., similar to the flow as shown in 306. In some emdobiments, the eNB 212 may trigger the D2D status change at 430 in response to an ending of the D2D communication of the D2D pair.

The eNB 212 may perform a mode selection in response to triggering the D2D status change at 430. For example, the eNB 212 may instruct the D2D UEs 202 and 204 to perform channel measurements. The eNB 212 may select a communication mode for the D2D UEs 202 and 204 based on the channel measurement results, e.g., SRS information. The eNB 212 may change the D2D mode to an eNB relay mode for the UEs 202 and 204 in response to determining that the eNB relay mode is more efficient than the D2D mode, e.g., Equation (6) is not satisfied. The eNB 212 may further identify one or more other UEs that are to share one or more resources with the UEs 202 and 204 in the selected eNB relay mode based on the measurement results.

Figure 5:
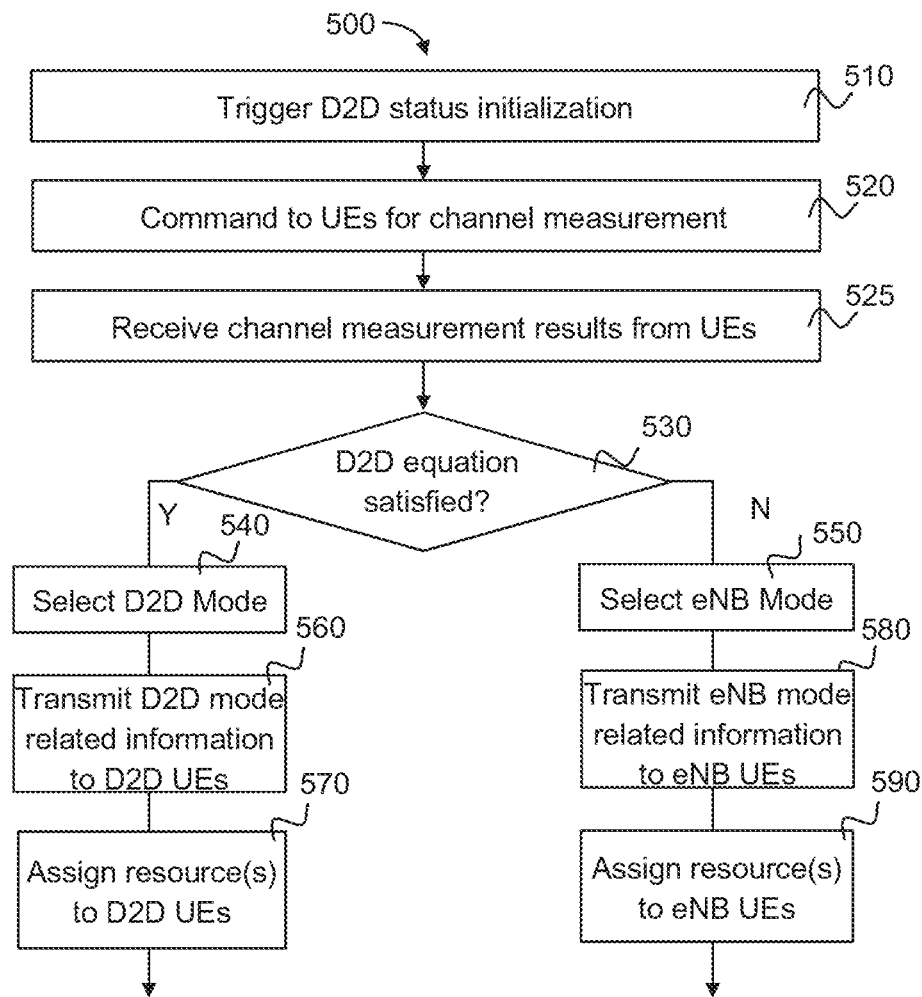
FIG. 5 schematically illustrates an example of a method according to an embodiment.

FIG. 5 schematically illustrates an example flow 500 for a D2D communication mode control in accordance with some embodiments. The flow 500 may be used by an eNB (e.g., eNB 212) for D2D status initialization and/or D2D status change. In some embodiments, the eNB 212 may trigger the D2D status initialization, e.g., similar to block 302 of FIG. 3. For example, the eNB 212 may trigger or initiate the D2D status initialization for two D2D candidates in response to determining that there is enough traffic between the two UEs. In some embodiments, the eNB 212 may trigger the D2D status initialization for the two D2D candidates in response to determining that the two UEs are close enough, e.g., based on location based service (LBS) information and/or network handover information associated with the two UEs.

In some embodiments, the eNB 212 may initiate the D2D status initialization for the pair of D2D candidates in response to receiving one or more requests for D2D communication from at least one of the two UEs. For example, the at least one of the two UEs may send the request to the eNB 212 via a message or the like. In some embodiments, a D2D candidate in the pair of D2D candidates may transmit a request for D2D communication to the eNB 212 in response to determining that there is enough traffic with a second D2D candidate of the pair. In some other embodiments, a D2D candidate may send the request for D2D communication to the eNB 212 during establishment of a communication link with a wireless network. In some embodiments, a D2D candidate may transmit any other information to the eNB 212 to request for the D2D mode.

At 520, the eNB 212 may command at least one D2D candidate UE to perform a channel measurement, e.g., based on SRS. The eNB 212 may transmit the measurement command to the at least one D2D candidate, e.g., via a signal, a message or any other information. The D2D candidate UEs may each provide a measurement result to eNB 212 in response to receiving the command from the eNB 212. At 525, the eNB 212 may receive the channel measurements results from the D2D candidate UEs.

At 530, the eNB 212 may use the one or more measurement results reported by the two D2D candidate UEs to decide which communication mode to select for the D2D candidate UEs. For example, the eNB 212 may perform a comparison between a cost model of a D2D communication mode with that of an eNB relay mode, e.g., as shown in Equation (6), based on the measurement results.

At 540, the eNB 212 may select the D2D mode for those UEs in response to determining that the condition in equation (6) is satisfied, e.g., the cost of the D2D mode is smaller than that of the eNB relay mode. The two UEs in the D2D mode may be called as D2D UEs. The eNB 212 may further determine a set of one or more other UEs that are to share one or more resources with the D2D UEs based on the channel measurement results in response to selecting the D2D mode (not shown). Contrarily, eNB 212 may not select the D2D mode. For example, at 550, eNB 212 may select the eNB relay mode in response to determining that the eNB mode is more effective, e.g., Equation (6) is not satisfied.

At 560, the eNB 212 may perform D2D mode initialization for the pair of D2D UEs in response to selecting the D2D mode for the pair of D2D candidate UEs at 540. In some embodiments, eNB 212 may transmit D2D mode related information associated with the selected D2D communication mode to the D2D UEs. The D2D UEs may utilize the D2D mode related information to perform UE configuration. For example, the D2D mode related information may comprise SRS configuration information for the pair of D2D UEs and the set of one or more other UEs that are to share one or more resources with the two D2D UEs. The D2D UEs and the set of one or more resource sharing UEs may use the SRS configuration information for possible resource sharing.

In some embodiments, the D2D mode related information may further comprise D2D related resource configuration information for the D2D UEs. In some other embodiments, the D2D mode related information may further comprise downlink/uplink control channel resource information for the D2D UEs for a centralized D2D control by the eNB 212. The pair of D2D UEs may utilize the D2D mode related information for UE configuration. In response to a completion of the configuration of the D2D UEs, a D2D communication session is set up for the D2D UEs. At 570, the eNB 212 may assign one or more uplink/downlink/control resources to the D2D UEs in response to the establishment of the D2D session.

On the contrary, eNB 212 may select the eNB relay mode in response to determining that the Equation (6) is not satisfied. The two UEs that are to communicate in the selected eNB relay mode may be called as eNB or cellular UEs. At 580, eNB 212 may transmit eNB mode related information to the two eNB UEs. The eNB mode related information may comprise SRS configuration information and/or resource configuration information relating to the eNB relay mode and/or downlink/uplink control channel resource information. The eNB UEs may utilize the eNB mode related information for UE configuration. In some embodiments, at 590, the eNB 212 may assign one or more resources, e.g., uplink/downlink/control resources, to the eNB UEs. In response to a completion of the configuration of the eNB UEs, a communication session in the selected eNB relay mode may be established.

Figure 6:
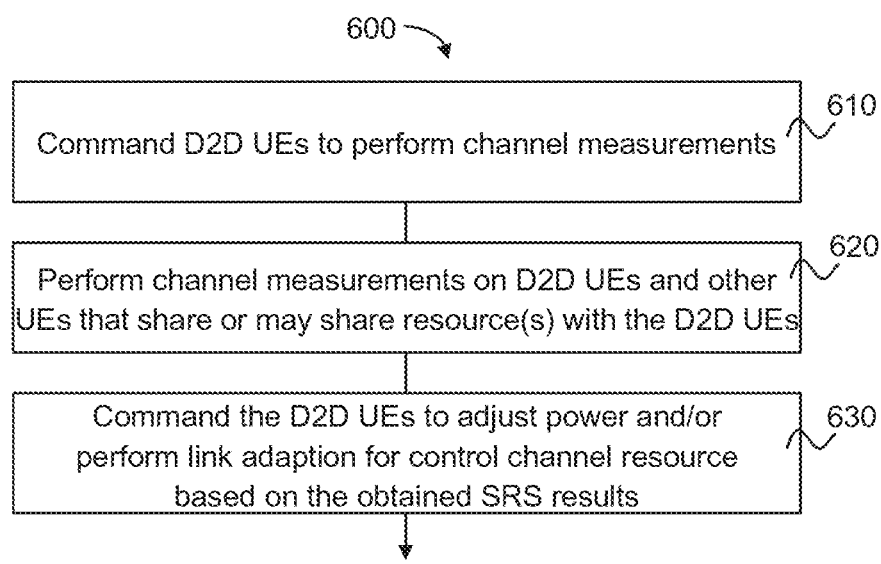
FIG. 6 schematically illustrates an example of a method according to an embodiment.

FIG. 6 schematically illustrates an example method 600 for a D2D communication mode control in accordance with some embodiments. The method 600 may be used by an eNB (e.g., eNB 212) to maintain the D2D communication. At 610, the eNB 212 instruct the D2D UEs to perform channel measurements. For example, a D2D UE in a D2D pair may measure SRS from the other D2D UE in the pair and/or one or more other UEs that may share one or more resources with the D2D UEs.

At 620, the eNB 212 may perform a channel measurement on the D2D UEs and one or more other UEs that share or may share resource(s) with the D2D UEs. For example, the eNB 212 may measure SRS of the D2D UEs and that of the resource sharing UEs. At 630, the eNB 212 may further command the D2D UEs to adjust a transmission power of the D2D UEs and/or perform link adaption based on the channel information, e.g., SRS measurement results, obtained by the D2D UEs and/or the channel information obtained by the eNB 212. In some embodiments, a first D2D UE in D2D pair may command a second D2D UE in the D2D pair to adjust a power of the second D2D UE and/or perform link adaption based on the channel information obtained by the first and second D2D UEs and/or channel information obtained by the eNB 212. For example, the first and second D2D UEs may perform the power adjustment and/or the link adaption similar to the flow as mentioned with regard to block 304.

Figure 7:
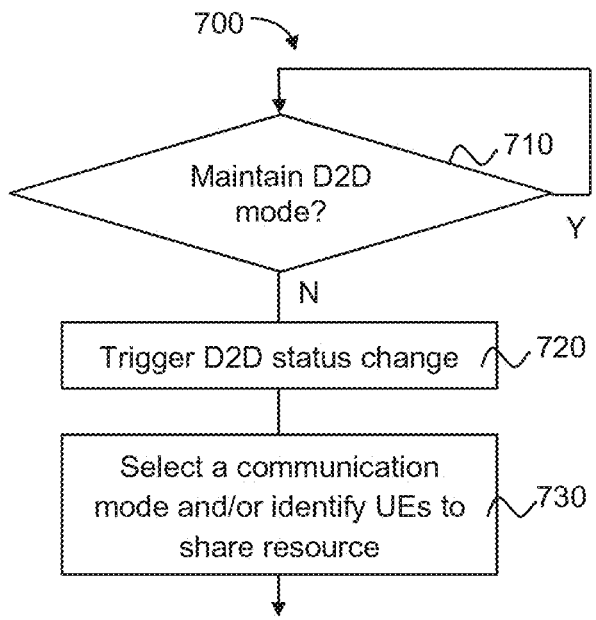
FIG. 7 schematically illustrates an example of a method according to an embodiment.

FIG. 7 schematically illustrates an example method 700 for a D2D communication mode control in accordance with some embodiments. The method 700 may be used by an eNB (e.g., eNB 212) to change D2D status (e.g., 430). At 710, the eNB 212 may determine whether to maintain a D2D communication mode, e.g., during a D2D communication session. For example, the eNB 212 may trigger a D2D status change at 720 in response to determining at 710 that the D2D communication session ends or the traffic of the D2D communication session is not enough or in response to finding that a second communication mode may be more efficient than the D2D communication mode, e.g., similar to 304 and 306 of FIG. 3. Contrarily, the eNB 212 may determine at 710 to maintain the D2D communication mode.

At 730, the eNB 212 may command a pair of D2D UEs in the D2D communication mode to each perform a channel measurement based on SRS, e.g., similar to block 520 of FIG. 5. The eNB 212 may select an eNB relay mode at 730 in response to determining that a cost of the eNB relay mode is smaller than that of the current D2D mode based on the channel measurement results from the pair of D2D UEs, e.g., similar to blocks 530 and 550. Further, in response to selecting the eNB relay mode for the pair of UEs, the eNB 212 may identify one or more other UEs that are to share resource(s) with the pair of UEs in the selected eNB relay mode, at 730. In response to determining the eNB relay mode for the pair of UEs, the eNB 212 may provide information relating to the determined eNB relay mode to the pair of UEs for UE configuration, e.g., as shown at 580. A communication in the identified eNB relay mode may be established in response to the UE configuration. The eNB 212 may further assign one or more resources to the pair of UEs in response to the setting up of the eNB relay mode, e.g., as shown at 590. Contrarily, the eNB 212 may not change the current D2D mode in response to determining that the cost of the eNB relay mode is higher than that of the D2D mode at 730, e.g., as shown in Equation (6).

Figure 8:
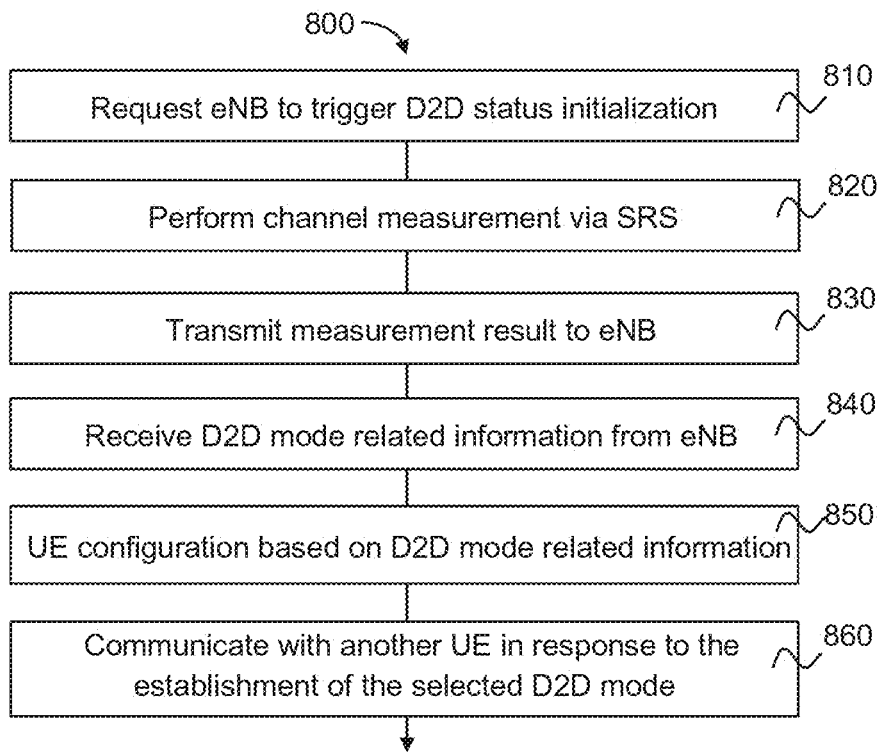
FIG. 8 schematically illustrates an example of a method according to an embodiment.

FIG. 8 schematically illustrates an example method 800 according to some embodiments. The method 800 may be utilized by a UE, e.g., 202, for D2D status initialization. At 810, the UE 202 may transmit a request to an eNB, e.g., 212, to trigger D2D status initialization. In some embodiments, the UE 202 may request eNB 212 to trigger the D2D status initialization during establishment of a communication with a wireless network (e.g., 100 of FIG. 1). In some embodiments, UE 202 may transmit the request for a D2D mode to the eNB 212 in response to arriving at or entering a cell of the eNB 212. In some embodiments, the UE 202 may send the request to the eNB 212 via a message or any other information to inform eNB 212 that a communication mode such as a D2D communication mode is desired. In some embodiments, the UE 202 may send the request for the D2D mode to the eNB 212 in response to determining that there is enough traffic with a second UE, e.g., 204. The pair of UEs 202 and 204 may be called as a pair of D2D candidate UEs. In some embodiments, the eNB 212 may command the D2D candidate UEs to perform channel measurements, e.g., as shown at 520.

At 820, UE 202 and/or 204 may perform the channel measurement based on a sounding reference signal (SRS) in response to receiving the command from eNB 212. The UE 202 and/or 204 may transmit the channel measurement results to the eNB 212 at 830. For example, the UE 202 and 204 may each report the SRS information obtained in the channel measurement to the eNB 212. The eNB 212 may select a D2D communication mode for the D2D candidates UEs in response to determining that the D2D mode has a smaller cost as compared with an eNB relay mode based on the SRS information obtained in the channel measurements by the UEs 202 and/or 204, e.g., as shown at 530 and 540. At 840, UE 202 and/or 204 may receive D2D mode related information from the eNB 212 for UE configuration.

At 850, UE 202 and/or 204 may perform UE configuration based on the D2D mode related information. In some embodiments, the eNB 212 may assign one or more resources for the D2D communication between UEs 202 and 204. At 860, the pair of D2D UEs 202 and 204 may communicate with each other.

Contrarily, in some embodiments, eNB 212 may select the eNB relay mode for the pair of UEs 202 and 204 in response to determining that the cost of D2D mode is higher than that of the eNB relay mode based on the measurement results from the UEs 202 and 204, e.g., as shown at 530 and 550. UEs 202 and 204 that are to communicate in the selected eNB relay mode may receive eNB relay mode related information from the eNB 212 in response that the eNB 212 selecting the eNB relay mode (now shown). UEs 202 and 204 may receive eNB mode related information from the eNB 212 to perform UE configuration (not shown) in response that the eNB mode is selected by the eNB 212. In some embodiments, UEs 202 and 204 may use one or more resources assigned by the eNB 212 (e.g., at 590) to communicate with each other in response to the establishment of the eNB relay mode (not shown).

Figure 9:
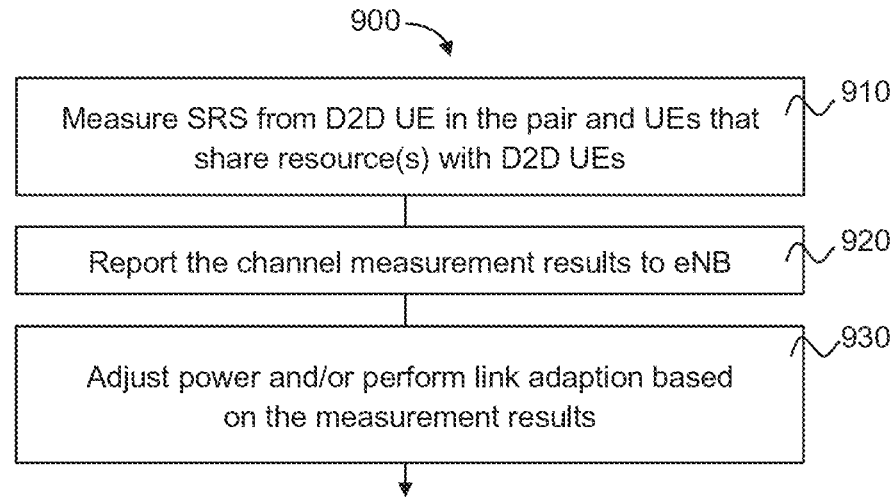
FIG. 9 schematically illustrates an example of a method according to an embodiment.

FIG. 9 schematically illustrates an example method 900. The method 900 may be utilized by a UE (e.g., 202), e.g., of a D2D UE pair. At 910, the UE 202 that communicates with a second UE in the D2D pair may receive a command from an eNB (e.g., eNB 212) that may instruct the UE 202 to perform a channel measurement. In response to receiving the eNB command, the UE 202 may measure, e.g., SRS of the second UE in the D2D pair and SRS of one or more other UEs that share or may share one or more resources with the D2D pair. For example, the UE 202 may perform the channel measurement (e.g., by SRS) on one or more eNB UEs that may share resource(s) with the D2D pair. In some embodiments, UE 202 may send the measurement results to the eNB 212 periodically or based on the eNB command.

At 930, UE 202 may adjust its power and/or perform link adaption based on the measurement results obtained at 910 in response to receiving a second command signal from eNB 212 or from a second UE that is in D2D communication with the UE 202. In some embodiments, the UE 202 may carry out link adaption and/or power control to control interference of the D2D communication, e.g., similar to 420 of FIG. 4.

Figure 10:
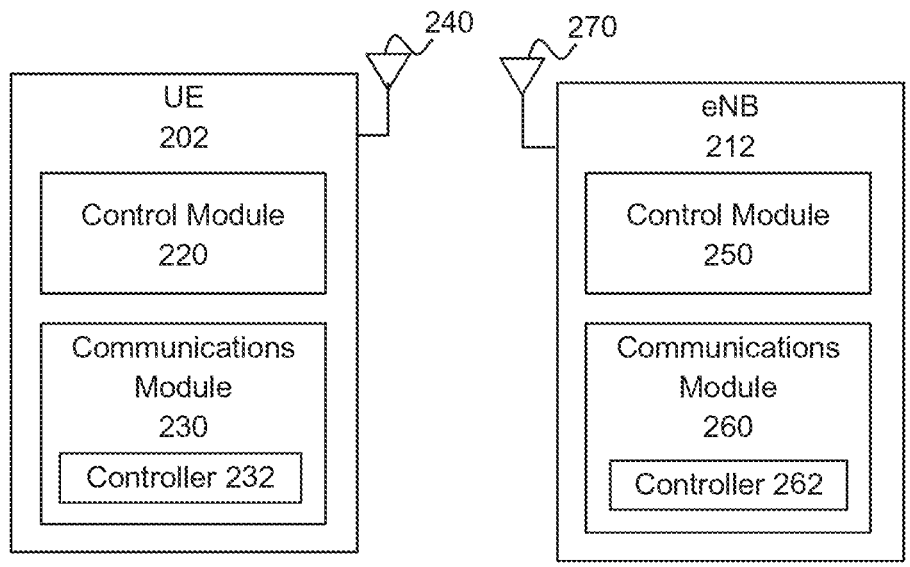
FIG. 10 schematically illustrates a wireless communication network including a user equipment (UE) and an evolved Node Bs (eNBs) in accordance with an embodiment.

FIG. 10 illustrates a wireless communication network 1000 in accordance with various embodiments. Wireless communication network 1000 (hereinafter "network 1000") may include a base station, e.g., eNB 212, that may communicate with a UE, e.g., 202, wirelessly.

In some embodiments, UE 202 may comprise a communications module 230 and a control module 220. The communications module 230 may be further coupled with a set of one or more antennas 270 of the eNB 212 for communicating wirelessly over network 1000. The UE 202 may include any suitable number of antennas 240. In some embodiments, the UE 202 may include at least as many antennas 240 as a number of simultaneous spatial layers or streams received by the UE 202 from the eNB 212; however, in some embodiments, the UE 202 may have a different number of antennas. The number of simultaneous spatial layers or streams may also be referred to as transmission rank, or simply rank. One or more of the antennas 240 may be alternately used as transmit or receive antennas. Alternatively, or additionally, one or more of the antennas 240 may be dedicated receive antennas or dedicated transmit antennas.

As shown in FIG. 10, eNB 212 may include a communications module 260 and a control module 250 coupled with one another at least as shown in FIG. 10. The communications module 260 may be further coupled with the one or more antennas 240 of the UE 202. The communications module 260 may communicate (e.g., transmit and/or receive) with one or more UEs (e.g., UE 202). In various embodiments, the eNB 212 may include at least as many antennas 270 as a number of simultaneous transmission streams transmitted to the UE 202; however, in some embodiments, the eNB 212 may have a different number of antennas. One or more of the antennas 270 may be alternately used as transmit or receive antennas. Alternatively, or additionally, one or more of the antennas 270 may be dedicated receive antennas or dedicated transmit antennas. Alternatively, or additionally, one or more of the antennas 270 may alternate between communicating in one or more cells. In some embodiments, the eNB 212 may have similar modules/components as e.g., eNB 112, 122 or 132; however, in some embodiments, this may not be required.

In some embodiments, the control module 250 of the eNB 212 may comprise one or more processors (not shown) that may include any combination of general-purpose processors and dedicated processors, e.g., graphics processors and application processors, etc. In some other embodiments, the one or more processors may further include any combination of general-purpose processors and dedicated processors, e.g., graphics processors, application processors, baseband processors, etc.

In some embodiments, the communications module 260 of the eNB 212 may comprise one or more controllers 262 that may perform one or more methods as mentioned herein. An example of the one or more controllers 262 may comprise a baseband processor. In some embodiments, the one or more controllers 262 may be employed in a baseband segment, e.g., a baseband chip of the eNB 212; however, in some embodiment, the one or more controllers 262 may be employed outside a baseband segment of the eNB 212. While FIG. 10 illustrates the one or more controllers 262 in the communications module 260, in some embodiments, the one or more controllers 262 may be in the control module 250.

In some embodiments, the communications module 230 of the UE 202 may comprise one or more controllers 232. An example of the one or more controllers 232 may comprise a baseband processor that may perform one or more methods as mentioned herein. In some embodiments, the one or more controllers 232 may be employed in a baseband segment, e.g., a baseband chip, of the UE 202; however, in some embodiment, the one or more controllers 232 may be employed outside baseband segment of the UE 202. While FIG. 10 illustrates the one or more controllers 232 in the communications module 230, in some embodiments, the one or more controllers 232 may be in the control module 220.

Figure 11:
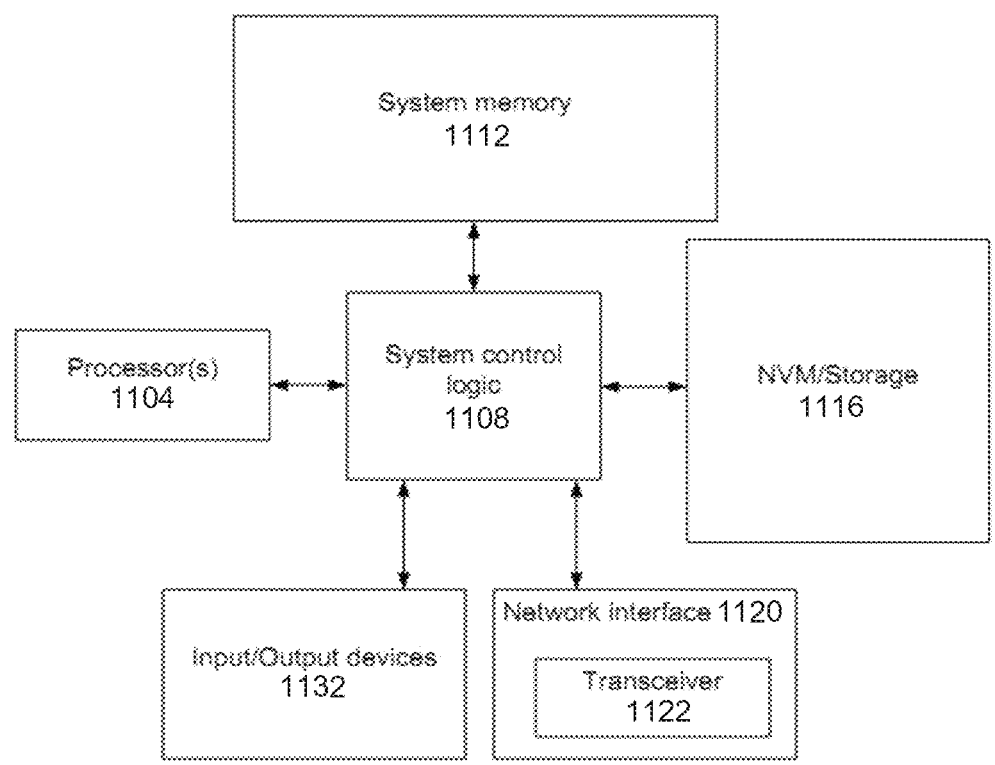
FIG. 11 schematically depicts an example system in accordance with an embodiment.

In some embodiments, the eNB 112, 122, 132 or 212 and/or UE 102, 104, 106, 202, 204 or 206 described herein may be implemented in a system using any suitable hardware, firmware and/or software as desired. In various embodiments, FIG. 11 illustrates an example system 1100 that may comprise one or more processor(s) 1104, system control logic 1108 coupled with at least one of the processor(s) 1104, system memory 1112 coupled with system control logic 1108, non-volatile memory (NVM)/storage 1116 coupled with system control logic 1108, a network interface 1120 coupled with system control logic 1108, and input/output (I/O) devices 1132 coupled with system control logic 1108.

The processor(s) 1104 may include one or more single-core or multi-core processors. The processor(s) 1104 may include any combination of general-purpose processors and dedicated processors (e.g., graphics processors, application processors, baseband processors, etc.).

System control logic 1108 for one embodiment may include any suitable interface controllers to provide for any suitable interface to at least one of the processor(s) 1104 and/or to any suitable device or component in communication with system control logic 1108.

System control logic 1108 for one embodiment may include one or more memory controller(s) to provide an interface to system memory 1112. System memory 1112 may be used to load and store data and/or instructions, for example, for system 1100. System memory 1112 for one embodiment may include any suitable volatile memory, such as suitable dynamic random access memory (DRAM), for example.

NVM/storage 1116 may include one or more tangible, non-transitory computer-readable media used to store data and/or instructions, for example. NVM/storage 1116 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1116 may include a storage resource physically part of a device on which the system 1100 is installed or it may be accessible by, but not necessarily a part of, the device. For example, the NVM/storage 1116 may be accessed over a network via the network interface 1120 and/or over Input/Output (I/O) devices 1132.

Network interface 1120 may have a transceiver 1122 to provide a radio interface for system 1100 to communicate over one or more network(s) and/or with any other suitable device. The transceiver 1122 may implement communications module 230 or 260. In various embodiments, the transceiver 1122 may be integrated with other components of system 1100. For example, the transceiver 1122 may include one or more of the processor(s) 1104, e.g., a baseband processor, memory of the system memory 1112, and NVM/Storage of NVM/Storage 1116. Network interface 1120 may include any suitable hardware and/or firmware. Network interface 1120 may include a plurality of antennas to provide a multiple input, multiple output radio interface. Network interface 1120 for one embodiment may include, for example, a wired network adapter, a wireless network adapter, a telephone modem, and/or a wireless modem.

For one embodiment, at least one of the processor(s) 1104 may be packaged together with logic for one or more controller(s) of system control logic 1108. For one embodiment, at least one of the processor(s) 1104 may be packaged together with logic for one or more controllers of system control logic 1108 to form a System in Package (SiP). For one embodiment, at least one of the processor(s) 1104 may be integrated on the same die with logic for one or more controller(s) of system control logic 1108. For one embodiment, at least one of the processor(s) 1104 may be integrated on the same die with logic for one or more controller(s) of system control logic 1108 to form a System on Chip (SoC).

In various embodiments, the I/O devices 1132 may include user interfaces designed to enable user interaction with the system 1100, peripheral component interfaces designed to enable peripheral component interaction with the system 1100, and/or sensors designed to determine environmental conditions and/or location information related to the system 1100.

In some embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In some embodiments, the peripheral component interfaces may include, but are not limited to, a non-volatile memory port, a universal serial bus (USB) port, an audio jack, and a power supply interface.

In some embodiments, the sensors may include, but are not limited to, a gyro sensor, an accelerometer, a proximity sensor, an ambient light sensor, and a positioning unit. The positioning unit may also be part of, or interact with, the network interface 1120 to communicate with components of a positioning network, e.g., a global positioning system (GPS) satellite.

In some embodiments, the system 1100 may be a mobile computing device such as, but not limited to, a laptop computing device, a tablet computing device, a netbook, a smartphone, etc. In various embodiments, system 1100 may have more or less components, and/or different architectures. In various embodiments, the system 110 may comprise a mobile device, such as a user equipment (UE), a mobile station (MS), a mobile wireless device, a mobile communication device, a tablet, a handset, or other type of mobile wireless device. The mobile device may include one or more antennas configured to communicate with a base station (BS), an evolved Node B (eNB), or other type of wireless wide area network (WWAN) access point. While two antennas are shown, the mobile device may have between one and four or more antennas.

In various embodiments, the mobile device may communicate using at least one wireless communication standard including Third Generation Partnership Project Long Term Evolution (3GPP LTE), Worldwide interoperability for Microwave Access (WiMAX), High Speed Packet Access (HSPA), Bluetooth, WiFi, or other wireless standards. The mobile device may communicate using separate antennas for each wireless communication standard or shared antennas for multiple wireless communication standards. The mobile device may communicate in a wireless local area network (WLAN), a wireless personal area network (WPAN), and/or a wireless wide area network (WWAN).

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "example" means that a particular feature, structure, or characteristic described in connection with the example is included in at least one embodiment of the present invention. Thus, appearances of the phrases "for example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as an equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as equivalents of one another, but are to be considered as separate and autonomous representations of the present invention.

Furthermore, the described features, structures, or characteristics may be combined in any suitable manner in one or more embodiments. In the following description, numerous specific details are provided, such as examples of search spaces, to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation may be made without the exercise of inventive faculty, and without departing from the principles and concepts of the invention. Accordingly, it is not intended that the invention be limited, except as by the claims set forth below.

While the methods of FIGS. 3-9 are illustrated to comprise a sequence of processes, the methods in some embodiments may perform illustrated processes in a different order.

While certain features of the invention have been described with reference to embodiments, the description is not intended to be construed in a limiting sense. Various modifications of the embodiments, as well as other embodiments of the invention, which are apparent to persons skilled in the art to which the invention pertains are deemed to lie within the spirit and scope of the invention.

What is claimed is:

1. A method, comprising:
   commanding each of a first user equipment (UE) and a second UE to perform a channel measurement, wherein the first UE and the second UE are in a cell of an enhanced Node B (eNB);
   determining, based on the channel measurements, a first plurality of spectrum efficiencies associated with a direct communication mode and a second plurality of spectrum efficiencies associated with a second communication mode;
   determining, based on the first plurality of spectrum efficiencies, a first cost of the direct communication mode;
   determining, based on the second plurality of spectrum efficiencies, a second cost of the second communication mode;
   comparing the first cost of the direct communication mode with the second cost of the second communication mode;
   selecting the direct communication mode for a communication between the first UE and the second UE in response to determining that the first cost is smaller than the second cost; and
   providing information to facilitate direct communication between the first UE and the second UE to the first UE and the second UE.

2. The method of claim 1, further comprising determining the first and second pluralities of spectrum efficiencies using a Shannon capacity formula.

3. The method of claim 1, wherein the second communication mode is an eNB relay communication mode and the method further comprises:
   determining the first cost, C D2D($UE_x$,$UE_y$), based on $$C\_D2D(UE_x, UE_y) = \frac{1}{SE\_D2D(UE_x)} + \frac{1}{SE\_D2D(UE_y)},$$

where SE D2D($UE_x$) is a spectrum efficiency, of the first plurality of spectrum efficiencies, for the first UE and SE D2D($UE_y$) is a spectrum efficiency, of the first plurality of spectrum efficiencies, for the second UE:
   determining the second cost, C eNB($UE_x$, $UE_y$), based on $$C_{eNB(UE_x,UE_y)} = \frac{1}{SE_{eNB_{UL}(UE_x)}} + \frac{1}{SE_{eNB_{UL}(UE_y)}} + \alpha * \left( \frac{1}{SE_{eNB_{DL}(UE_x)}} + \frac{1}{SE_{eNB_{DL}(UE_y)}} \right);$$

where $SE_{eNB_{UL}(UE_x)}$ is an uplink spectrum efficiency, of the second plurality of spectrum efficiencies, for the first UE in the eNB relay communication mode, $SE_{eNB_{UL}(UE_y)}$ is an uplink spectrum efficiency, of the second plurality of spectrum efficiencies, for the second UE in the eNB relay communication mode: $SE_{eNB_{DL}(UE_x)}$ is a downlink spectrum efficiency, of the second plurality of spectrum efficiencies, for the first UE in the eNB relay communication mode, $SE_{eNB_{DL}(UE_y)}$ is a downlink spectrum efficiency, of the second plurality of spectrum efficiencies, for the second UE in the eNB relay communication mode; and
   selecting the second communication mode in response to determining that the second cost is smaller than the first cost.

4. The method of claim 1, wherein a result of the channel measurement from each of the first UE and the second UE comprises a sounding reference signal.

5. The method of claim 1, wherein the information comprises sounding reference signal configuration information for the first UE, the second UE and a third UE that is to share one or more resources of the eNB with the first UE and the second UE, direct communication related resource configuration information for the first UE and the second UE, downlink/uplink control channel resource information for the first UE and the second UE.

6. One or more non-transitory computer-readable media having instructions stored thereon, that, when executed cause an enhanced Node B (eNB) to:
   command each of a first user equipment (UE) and a second UE to perform a channel measurement, wherein the first UE and the second UE are in a cell of the eNB;
   determine, based on the channel measurements, a first plurality of spectrum efficiencies associated with a direct communication mode and a second plurality of spectrum efficiencies associated with a second communication mode;
   determine, based on the first plurality of spectrum efficiencies, a first cost of the direct communication mode;
   determine, based on the second plurality of spectrum efficiencies, a second cost of the second communication mode
   compare the first cost of the direct communication mode with the second cost of the second communication mode;
   select the direct communication mode for a communication between the first UE and the second UE in response to determining that the first cost is smaller than the second cost; and
   provide information to facilitate direct communication between the first UE and the second UE to the first UE and the second UE.

7. The one or more non-transitory computer-readable media of claim 6, having instructions stored thereon, that, when executed cause the eNB further to: determine the first and second pluralities of spectrum efficiencies using a Shannon capacity formula.

8. The one or more non-transitory computer-readable media of claim 6, wherein the second communication mode is an eNB relay communication mode and the instructions, when executed, further cause the eNB to:

determine the first cost, C D2D($UE_x$, $UE_y$), based on $$C\_D2D(UE_x, UE_y) = \frac{1}{SE\_D2D(UE_x)} + \frac{1}{SE\_D2D(UE_y)},$$

where SE D2D($UE_x$) is a spectrum efficiency, of the first plurality of spectrum efficiencies, for the first UE and SE D2D($UE_y$) is a spectrum efficiency, of the first plurality of spectrum efficiencies, for the second UE;

determine the second cost, C eNB($UE_x$, $UE_y$), based on $$C_{eNB(UE_x, UE_y)} = \frac{1}{SE_{eNB_{UL}(UE_x)}} + \frac{1}{SE_{eNB_{UL}(UE_y)}} + \alpha * \left( \frac{1}{SE_{eNB_{DL}(UE_x)}} + \frac{1}{SE_{eNB_{DL}(UE_y)}} \right),$$

where $SE_{eNB_{UL}(UE_x)}$ is an uplink spectrum efficiency, of the second plurality of spectrum efficiencies, for the first UE in the eNB relay communication mode, $SE_{eNB_{UL}(UE_y)}$ is an uplink spectrum efficiency, of the second plurality of spectrum efficiencies, for the second UE in the eNB relay communication mode; $SE_{eNB_{DL}(UE_x)}$ is a downlink spectrum efficiency, of the second plurality of spectrum efficiencies, for the first UE in the eNB relay communication mode, $SE_{eNB_{DL}(UE_y)}$ is a downlink spectrum efficiency, of the second plurality of spectrum efficiencies, for the second UE in the eNB relay communication mode; and select the second communication mode in response to determination that the second cost is smaller than the first cost.

9. The one or more non-transitory computer-readable media of claim 6, having instructions stored thereon, that, when executed cause the eNB further to: receive a result of the channel measurement from each of the first UE and the second UE, wherein each of the result of the channel measurement comprises a sounding reference signal.

10. The one or more non-transitory computer-readable media of claim 6, wherein the information comprises sounding reference signal configuration information for the first UE, the second UE and a third UE that is to share one or more resources of the eNB with the first UE and the second UE, direct communication related resource configuration information for the first UE and the second UE, downlink/uplink control channel resource information for the first UE and the second UE.

11. The one or more non-transitory computer-readable media of claim 6, having instructions stored thereon, that, when executed cause the eNB further to:

assign one or more resources of the eNB for a direct communication to the first UE and the second UE in response to selecting the direct communication mode.

12. The one or more non-transitory computer-readable media of claim 6, having instructions stored thereon, that, when executed cause the eNB further to:

command at least one of the first UE and the second UE to perform a channel measurement periodically during the direct communication mode.

* * * * *

UNITED STATES PATENT AND TRADEMARK OFFICE
CERTIFICATE OF CORRECTION

PATENT NO. : 9,572,186 B2
APPLICATION NO. : 14/588090
DATED : February 14, 2017
INVENTOR(S) : Rongzhen Yang et al.

Page 1 of 1

It is certified that error appears in the above-identified patent and that said Letters Patent is hereby corrected as shown below:

In the Claims

Column 22
Line 55, add a --;-- after the word "mode".

Signed and Sealed this
Thirtieth Day of May, 2017

Michelle K. Lee
*Director of the United States Patent and Trademark Office*